United States Patent [19]
Wilkinson et al.

[11] 3,909,085
[45] Sept. 30, 1975

[54] PRELOADED BEARINGS
[75] Inventors: Wilfred Henry Wilkinson, Turnditch; Leo Bernard Diver, Derby, both of England
[73] Assignee: Rolls-Royce (1971) Limited, London, England
[22] Filed: Aug. 27, 1974
[21] Appl. No.: 500,941

[30] Foreign Application Priority Data
Sept. 8, 1973 United Kingdom............ 42351/73

[52] U.S. Cl............................ 308/189; 308/187
[51] Int. Cl.² ........................................ F16C 13/00
[58] Field of Search.......... 308/184, 189, 194, 196, 308/197, 199, 187

[56] References Cited
UNITED STATES PATENTS
| | | | |
|---|---|---|---|
| 2,635,300 | 4/1953 | Butler | 308/189 R |
| 3,245,734 | 4/1966 | Morley | 308/184 R |
| 3,285,004 | 11/1966 | Hopley | 308/109 |
| 3,385,510 | 5/1968 | Hollander, Sr. | 308/189 R |
| 3,531,167 | 9/1970 | Edge et al. | 308/187 |

Primary Examiner—M. Henson Wood, Jr.
Assistant Examiner—Richard A. Bertsch
Attorney, Agent, or Firm—Cushman, Darby & Cushman

[57] ABSTRACT

A preloaded bearing assembly for use between two concentric and relatively rotatable members (such as the main shafts in gas turbine engines) which are also liable to axial movement relative to each other. The bearing has two rows of ball-elements with their respective races. The outer race of the first row is fixed, while the inner races of both rows are part of a common carrier member which rotates with the inner of the concentric members but is free to slide axially on it. The outer race of the second row is slidingly located on the outer concentric member and is spring-loaded in the direction of the outer race of the first row. This pre-load acts to prevent skidding of the bearings because the loading is transferred through the second row balls to the carrier member and back through the first row balls to the fixed race.

2 Claims, 3 Drawing Figures

PRELOADED BEARINGS

This invention relates to rolling element bearings of the type in which a bearing race is spring loaded to bear against the rolling elements so that even under operating conditions in which the bearing is lightly loaded in the axial and/or radial directions, reaction forces between the races and the rolling elements are maintained at a high enough value to avoid skidding or sliding of the rolling elements against the races. Such bearings are often referred to in the art as "preloaded" bearings, and will be so described hereafter. In particular the invention relates to a preloaded ball bearing as used to support rotating shafts, e.g. in gas turbine engine.

Preloaded ball bearings for shafts are known in which one of the races is fixed in its supporting structure, the other race being a sliding fit on its supporting structure, the latter race being urged against the balls by means of a spring member or other suitable means exerting an axial force against the side of the race.

Such a bearing, however is not suitable for use as a bearing located between two relatively rotating concentric shafts which are liable to move relative to each other in an axial direction, e.g. the two concentric shafts of a two-shaft gas turbine engine, the outermost one of which connects the high-pressure turbine to the high pressure compressor, the innermost one of which connects the low-pressure turbine to the low-pressure compressor. Such shafts in gas turbine engines are subjected to differential longitudinal expansion due to temperature and axial loading differences.

The object of the invention is thus to provide a preloaded bearing which is suitable for use in the above stated conditions.

According to the invention there is provided a two-row preloaded ball bearing assembly for use between first and second relatively rotating concentric members which are also liable to move axially relative to each other, said bearing assembly having:

a first bearing row race fixedly mounted on said first concentric member, a second row race axially spaced from said first row race and mounted on said first concentric member, said second row race being axially slideable thereon within limits and axially preloaded towards the first row, and a common annular race-carrier member mounted on said second concentric member and adapted to carry first and second row races opposing those aforementioned, said carrier member having means securing it against rotation relative to said second concentric member but allowing axial sliding thereon.

In order to secure the common annular carrier member against rotation relative to the second concentric member, it may be provided with radially projecting axially extending splines or dogs which mesh with corresponding splines on said second concentric member to ensure rotation therewith whilst not restraining the relative axial movement therebetween.

The preload on the second row race may be applied by a spring device comprising one or more Belville washers acting between an abutment on the first concentric member and the race.

By way of example the invention is illustrated in the accompanying drawings in which.

Figure 1:
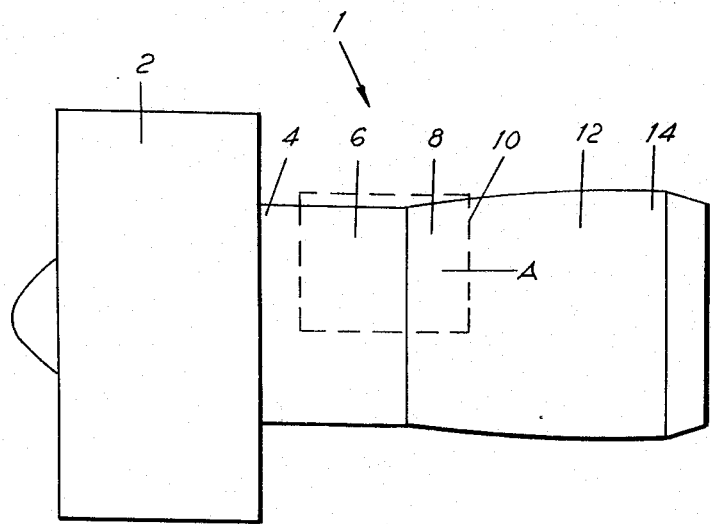
FIG. 1 shows a gas turbine engine such as may incorporate the invention.

In FIG. 1, a ducted fan gas turbine engine 1 comprises, in flow series, a fan section 2, low pressure compressor 4, high pressure compressor 6, combustion section 8, high pressure turbine 10, low pressure turbine 12 and exhaust duct and propulsion nozzle section 14. The engine is of the two shaft type in which the low pressure turbine drives the low pressure compressor and fan and the high pressure turbine drives the high pressure compressor. The low pressure (l.p.) turbine drives the l.p. compressor and fan through a hollow shaft 16 (FIG. 2), designated the l.p. shaft. The high pressure (h.p.) turbine 10 drives the h.p. compressor 6 through a hollow h.p. shaft 20 which is concentric with and surrounds the l.p. shaft 16. The h.p. shaft 20 is supported at its rear end from static structure 22 by means of ball bearing 24. These two bearings are lubricated by means of an oil supply issuing from nozzles 28 in an oil manifold member 30. The other end of the shaft is similarly supported.

L.P. shaft 16 is also supported by bearings (not shown) at its front and rear ends. However, the l.p. shaft is much longer than the h.p. shaft and it is hence desirable to provide support for it somewhere along its length between front and rear bearings. This may be done by inserting a bearing, generally indicated by the numeral 32, between the l.p. and h.p. shafts. The bearing 32 is located at the front end of the h.p. shaft 20 and substantially at the midpoint of the l.p. shaft 16 so that shaft 16 is effectively supported and steadied from shaft 20 which is in turn supported by bearings 24 and 26.

The need for bearing 32 is apparent when one considers the condition of shaft 16 at rest and when rotating. At rest, the shaft will tend to sag under its own weight in the middle relative to its ends, and if the engine is allowed to stand without its shafts being rotated for a sufficiently long period, this could result in slight but dynamically serious permanent deformation of the shaft. Because of this tendency to deform under its own weight and because it is not possible to manufacture a perfectly straight and rotationally symmetrical shaft, the centre of mass of any shaft or section of shaft will tend to be offset from the axis of rotation as defined by a line passing through the centres of both end bearings. The shaft will thus tend to rotate eccentrically producing the phenomenon known to engineers as "whirling".

Whirling produces excessive vibration and is mechanically damaging to the supporting bearings.

It will thus be seen that a bearing 32 will help to prevent sagging while shaft 16 is at rest and help to prevent whirling while shaft 16 is rotating.

Unfortunately it is not sufficient to provide a simple ball or roller bearing between shafts 16 and 20, the bearing having inner and outer races fixedly located on shaft 16 and shaft 20 respectively. Such an arrangement is impractical because relative longitudinal movement takes place between the shafts as they alter slightly in length due to temperature differences. Aerodynamic loadings on the turbine and compressor blades are transmitted to the shafts and also tend to alter their lengths. The shafts may also "shunt" slightly between their front and rear bearings. Further, a bearing located between the two shafts will be lightly loaded, i.e. the reactions at the points of contact between the rolling elements and their races will be small, and if there is a high enough difference in rotational speed between the shafts, "skidding" or sliding of the rolling elements against the races will occur leading to mechanical damage to the bearing.

Figure 2:
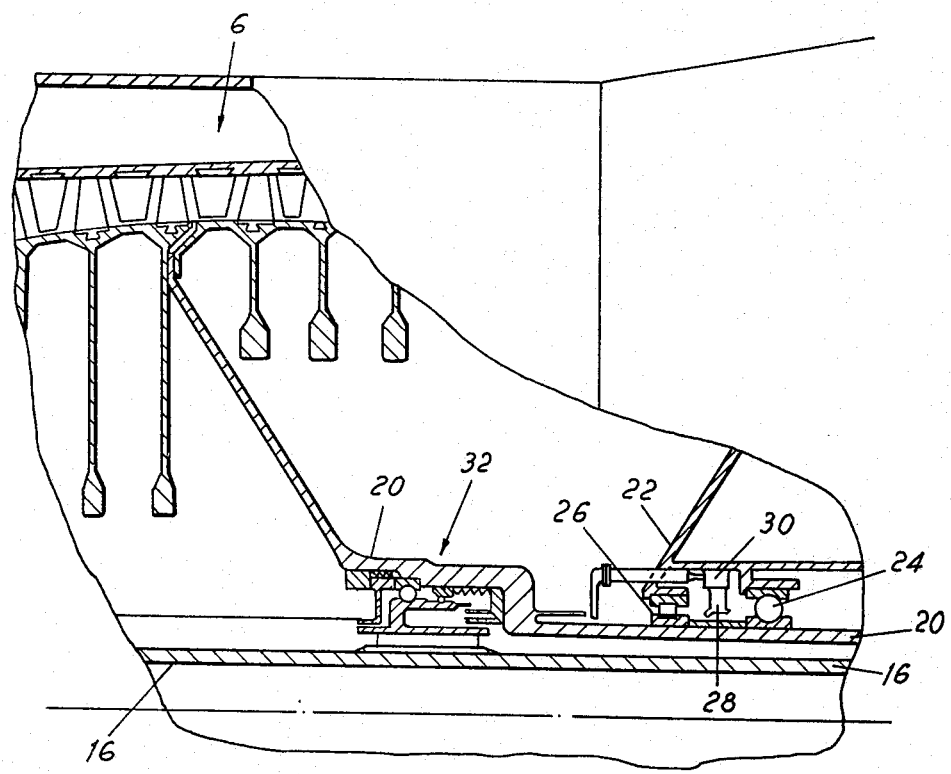
FIG. 2 is a part sectional "broken-away" diagrammatic view of the area designated A and defined by the pecked lines in FIG. 1, showing the position of an embodiment of the invention relative to other components of the gas turbine engine.
Figure 3:
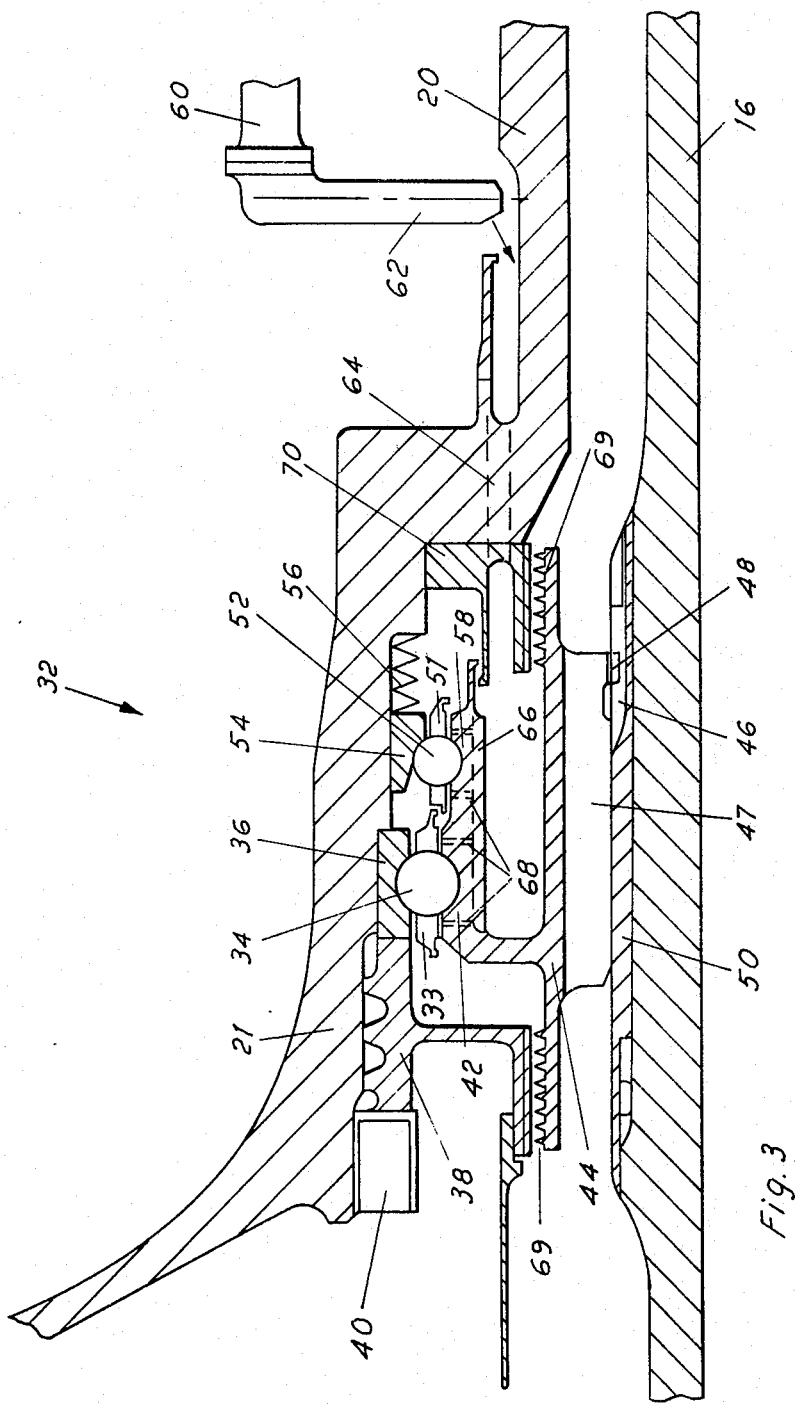
FIG. 3 is a scrap view of the bearing according to the invention showing greater detail.

In order to overcome the above problems, a bearing assembly according to the invention may be used. Bearing 32 in FIG. 2 is such a bearing, and is illustrated in more detail in FIG. 3.

Bearing 32 consists of a two-row ball assembly, the front row 34 of larger balls taking the main journal loads. Outer race 36 of the front bearing is a tight fit in its housing in the flared end 21 of the bore of the h.p. shaft 20. Race 36 is further clamped in position by annular member 38 and annular retaining nut 40. The inner race 42 is fixed to an annular carrier member 44 which engages longitudinally extending splines 46 on l.p. shaft 16 with its own dogs 48. The dogs 48 are part of radially extending rib members 47 which can slide against sleeve portion 50 of shaft 16. Shaft 16 is thus free to move relative to shaft 20 and the carrier 44 in an axial direction, but race 42 is constrained to rotate with shaft 16.

The rear row 52 of small balls has an outer race 54 which is spring loaded axially towards race 36 by one or more spring members, shown diagrammatically at 56. Such spring members could be a Belville or corrugated washer type of spring. Outer race 54 is free to slide axially in its housing in flared portion 21 of h.p. shaft 20.

The inner race 58 of the rear bearing row 52 is adjacent the inner race 42 of the front bearing row 34 and is fixed to the same carrier member 44.

Lubrication of the two bearing rows 34 and 52 is accomplished by feeding oil from manifold 30 (FIG. 2) through pipe 60 and nozzle 62 into passage 64 through the wall thickness of shaft 20. Due to centrifugal forces the oil flows over the radially outer part of the passage 64 and is hence fed to axially extending channels 66 on the radially inner sides of the races 42 and 58. From there the oil flows through holes 68 in the races to lubricate the bearings 34 and 52, together with bearing cage members 33 and 51. Labyrinth seals 69 are provided between extensions of the carrier member 44 and members 38 and 70 rotating with shaft 20. These seals prevent ingress to the bearings of air flowing through the annular duct formed between shafts 16 and 20.

In operation the journal row 34 is preloaded by means of the transfer of preload forces from the spring urged race 54 through rear ball row 52 to inner races 58 and 42 and thence through journal ball row 34 to fixed outer race 36. Balls and races are thus given greater bearing reaction forces and skidding of the balls is substantially avoided.

We claim:

1. A two-row preloaded ball bearing assembly for use between first and second relatively rotating concentric members which are also liable to move axially relative to each other, said bearing assembly having:
   a first bearing row race fixedly mounted on said first concentric member,
   a second row race axially spaced from said first row race and mounted on said first concentric member, said second row race being axially slideable thereon within limits and axially preloaded towards the first row, and
   a common annular race-carrier member mounted on said second concentric member and adapted to carry first and second row races opposing those aforementioned, said carrier member having means securing it against rotation relative to said second concentric member but allowing axial sliding thereon, and said common annular race-carrier member having radially projecting axially extending dogs which mesh with corresponding splines on the second concentric member to ensure rotation of the carrier therewith without restraining relative axial movement therebetween.

2. A bearing assembly according to claim 1 in which the preload on the second row race is applied by a spring device comprising at least one Belville washers acting between an abutment on the first concentric member and the race.

* * * * *